United States Patent
Naruki et al.

(10) Patent No.: US 6,556,530 B2
(45) Date of Patent: Apr. 29, 2003

(54) COMPATIBLE DISK DEVICE

(75) Inventors: Kenichi Naruki, Tokyo (JP); Masaaki Takeshima, Tokyo (JP); Atsushi Michimori, Tokyo (JP); Masaki Kobayashi, Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/907,747

(22) Filed: Jul. 19, 2001

(65) Prior Publication Data

US 2002/0031076 A1 Mar. 14, 2002

Related U.S. Application Data

(63) Continuation of application No. PCT/JP99/07121, filed on Dec. 17, 1999.

(51) Int. Cl.[7] .................... G11B 17/028; G11B 25/04; G11B 17/035; G11B 17/04; G11B 33/12
(52) U.S. Cl. .................... 369/77.1; 369/77.2
(58) Field of Search .................... 369/77.1, 270, 369/264, 77.2

(56) References Cited

U.S. PATENT DOCUMENTS 5,812,511 A * 9/1998 Kawamura et al. ........ 369/75.1

FOREIGN PATENT DOCUMENTS

| JP | A 4105283 | 4/1992 |
| JP | A 7130063 | 5/1995 |
| JP | A 7220355 | 8/1995 |
| JP | A 7226006 | 8/1995 |
| JP | A 9231654 | 9/1997 |
| JP | 11-224451 | * 8/1999 |

* cited by examiner

*Primary Examiner*—William Klimowicz
(74) *Attorney, Agent, or Firm*—Birch, Stewart, Kolasch, & Birch, LLP

(57) ABSTRACT

A compatible disk device includes: a base; a first turntable disposed on the base for transmitting a rotational force to a first disk; a second turntable for transmitting a rotational force to a second disk; a retaining arm for retaining the second turntable with a play; a support shaft disposed on the base in a position separated from either the first disk supported by the first turntable or the second disk supported by the second turntable; and a sub-base attached pivotally to the support shaft, the sub-base supporting the retaining arm to be rotatable in a plane parallel to a disk surface of the first disk or the second disk and to be elevated in an axial direction of the support shaft.

15 Claims, 15 Drawing Sheets

FIG.14(A)    FIG.14(B)    FIG.14(C)
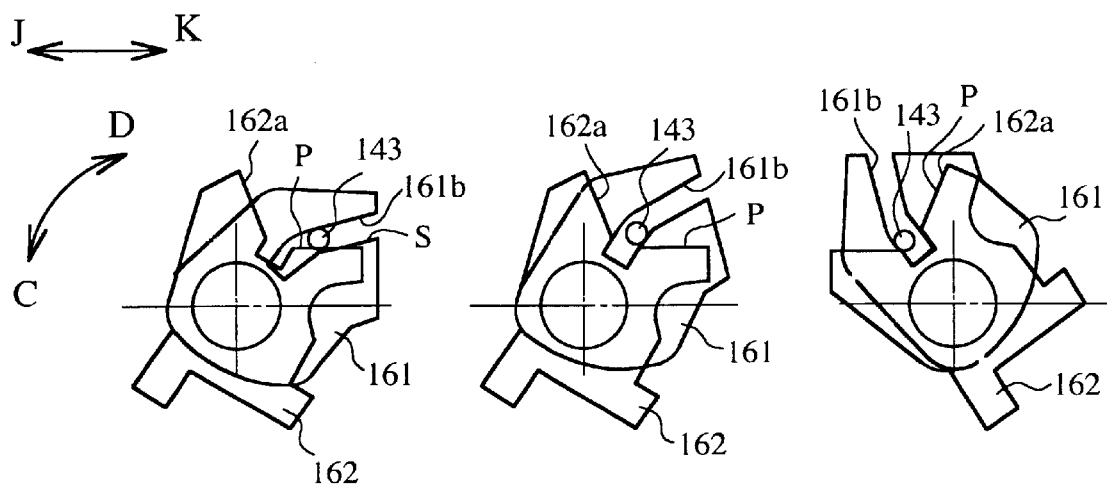
FIG.15(A)    FIG.15(B)
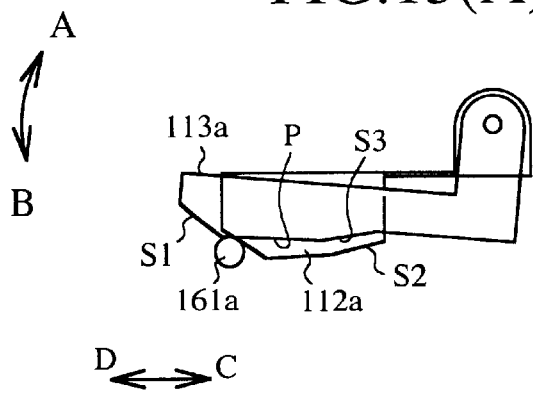
FIG.15(C)    FIG.15(D)
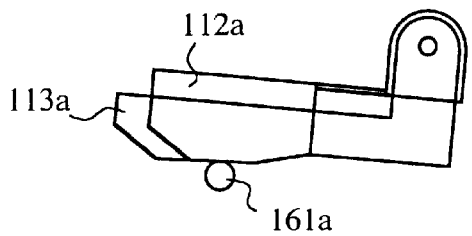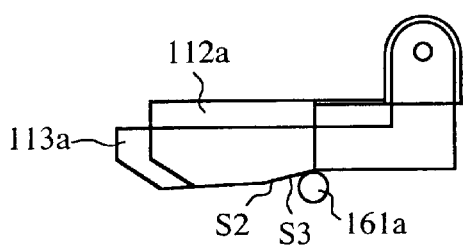

COMPATIBLE DISK DEVICE

CROSS-REFERENCE TO THE RELATED APPLICATION

This Application is a continuation of International Application No. PCT/JP99/07121, whose International filing date is Dec. 17, 1999, the disclosures of which Application are incorporated by reference herein. The present application has not published in English.

BACKGROUND OF THE INVENTION

1. Field of the Invention

The present invention relates to a compatible disk device capable of compatibly playing a first disk such as a minidisk (MD) which is stored in a cartridge, and a second disk such as a compact disk (CD) which is not stored in a cartridge. In particular, the present invention relates to a compatible disk device with a mechanism for displacing a clamp or a turntable, which rotates the second disk, to a position free from interference with the first disk at the time of loading and playing it.

2. Description of the Prior Art

[Prior Art 1]

FIG. 1(A) to FIG. 1(C) show the structure of a first conventional MDCD compatible disk device as disclosed for example in JP-A-7-220355. FIG. 1(A) is a front view showing the internal structure of the compatible disk device with an MD as a first disk which is inserted into the device. FIG. 1(B) is a front view showing the internal structure of the compatible disk device with the MD shown in FIG. 1(A) which is loaded to a playing position. FIG. 1(C) is a front view showing the internal structure of the compatible disk device with a CD as a second disk, which is loaded to a playing position.

In the figures, reference numeral 1 denotes a base of the compatible disk device, 2 is a housing, 3 is a sub-base which can be moved up and down by an elevator motor M in the housing 2. A spindle motor 4 for rotating the first disk A or the second disk B is fixed on a central portion of the sub-base 3. A first turntable 5 is fixed co-axially on the spindle motor 4 in order to determine the position of a central hole of the first disk A stored in a cartridge C and to rotatably drive the first disk A which is supported by a supporting face (not shown). 6 is an optical pickup which can reciprocate on the sub-base 3 in a radial direction of the first disk A or the second disk B to perform reading of information with respect to the first disk A or the second disk B. 7 is a second turntable which determines the position of the central hole of the second disk B not stored in the cartridge C and rotatably drives the second disk B supported by a supporting face (not shown). 8 is a retaining member which retains the second turntable 7. The retaining member 8 cooperates with the second turntable 7 to retain the second disk B. The retaining member 8 is supported to the housing 2 by use of a shock absorber. 9 is a clamp holder which retains the clamp 10 for clamping the second disk B placed on the second turntable 7. The clamp holder 9 and the clamp 10 can be elevated with respect to the second turntable 7. When the first disk A is in a loaded mode, they are stopped in an ascent position near the roof of the housing 2. When the second disk B is in a loaded mode, they are stopped in a descent position and the second disk B is clamped between the second turntable 7 and the clamp 10. 11 is a guide member which retains and guides the cartridge C of the first disk A.

Next, the operation of the first conventional compatible disk device will be described below.

When the first disk A is played, as shown in FIG. 1(A), the cartridge C is inserted into the guide member 11. Then, the sub-base 3 is raised in a direction of the arrow E in the figure by the operation of the elevating motor M, the first turntable 5 is displaced to the state as shown in FIG. 1(B), that is to say, to a position which abuts with the fixed clamp area in the first disk A. Next, the first disk A is rotated and played by the rotation of the spindle motor 4.

When the second disk B is played, the second disk B is inserted into the gap between the retaining member 8 and the clamp 10. Then, the subbase 3 is raised in the direction of the arrow E in the figure by the operation of the elevating motor M to the state as shown in FIG. 1(C), that is to say, to a position in which the first turntable 5 abuts with the fixed clamp area in the second disk B. At this time, the clamp holder 9 performs a descent operation in a direction of the arrow F in the figure and the second disk B is gripped with the second turntable 7. The guide member 11 performs a refuge operation in a lateral direction in order to create a space to raise the sub-base 3. After this series of operations is completed, the first turntable 5 and the linked second turntable 7 are rotated by the rotation of the spindle motor 4. In this way, the second disk B is rotated and a playing operation is performed.

[Prior Art 2]

FIG. 2, FIG. 3 and FIG. 4(A) to FIG. 4(C) show the structure of a second conventional MD-CD compatible disk device as disclosed for example in JP-A-9-231654. FIG. 2 is a perspective view showing main components mounted on a base. FIG. 3 is a perspective view showing the structure of a disk holder. FIG. 4(A) to FIG. 4(C) are front views for explaining the refuge operation of a turntable. Constitutive elements of the second conventional compatible disk device which are the same as those of the first conventional compatible disk device are denoted by the same reference numerals and the additional description will be omitted.

As shown in FIG. 2, a long and narrow aperture 1a which extends to a position proximate to the spindle motor 4 is formed on the base 1, an optical pickup 6 is disposed on a lower face of the base 1 to reciprocate along a longitudinal direction of the aperture 1a. A rotation shaft 12 is attached to the base 1, a retaining arm 13 is attached to the rotation shaft 12 to slide in an axial direction of the rotation shaft 12. A second turntable 7 is retained with a play on the retaining arm 13.

In FIG. 2, reference numeral 14 denotes a gear portion which is formed on the retaining arm 13 and which transmits a driving force of the drive motor 15 through the gear 16 and the gear 17. 18 is a triangular cam which is formed near to the rotation shaft 12 of the base 1 as shown in FIG. 4(A) to FIG. 4(C) and which has a cam face which undulates along a section of the imaginary circle defined by the rotation of the retaining arm 13. 19 is a boss which is formed at a position facing the triangular cam 18 on the rear face of the retaining arm 13 and which slides on the cam face of the triangular cam 18 when the retaining arm 13 is rotated.

In FIG. 3, reference numeral 20 denotes a disk holder assembly which is slidably supported on the base 1 by a support shaft 21. 22 is a box-shaped disk holder which has an aperture 23. A damp 10 is retained with a play on the roof of the disk holder 22, the damp 10 and the disk holder 22 can slide in the direction of the arrow Q1–Q2 in FIG. 3 with respect to the disk holder assembly 20.

Next, the operation of the second conventional MD-CD compatible disk device will be described below.

In a state where the second turntable 7 is loaded on the first turntable 5, when playing a CD as a second disk, the disk holder 22 is displaced in the direction of the arrow Q1 by a driving source (not shown) with the insertion of the CD through the aperture 23. The disk holder assembly 20 pivots downward about the support shaft 21. Then, the clamp 10 presses the CD onto the second turntable 7 and CD loading is completed. Thereafter, the spindle motor 4 is rotated and a playing operation of the CD is commenced.

When an MD is played as a first disk, the insertion of the cartridge (not show) into the aperture 23 of the disk holder 22 is detected by a sensor (not shown), the retaining arm 13 is rotated by the rotational driving force of the drive motor 15 in a direction of the arrow Y through the gear 16, the gear 17 and the gear portion 14. Together with this rotating operation, as shown in FIG. 4(A) to FIG. 4(C), the retaining arm 13 is elevated by the sliding of the boss 19 on the sloping face of the triangular cam 18. As a result, the second turntable 7 which is retained by the retaining arm 13 is rotated and separates from the first turntable 5. After passing the top of the triangular cam 18, the second turntable 7 rotates and is moved downward while refuging from the first disk. The second turn table 7 stops at a position situated on a level free from interference with the cartridge (not shown) of the first disk.

In parallel with this operation, the disk holder 22 is displaced in the direction of the arrow Q1 by the driving source (not shown), the disk holder assembly 20 pivots downwardly about the support shaft 21, and the loading of the cartridge on the first turntable 5 is completed. Thereafter, the spindle motor 4 is rotated and a playing operation of the MD is commenced.

In the first conventional compatible disk device, the problem has arisen that the thickness of the device can not be reduced, since the first turntable 5 and the second turntable 7 are superimposed in a vertical direction when either a first or a second disk are played.

In the second conventional compatible disk device, the problem has arisen that the device can not be downsized due to large dimensions in a direction of depth caused by the second turntable 7 refuging to a position on a level free from interference with the cartridge of the first disk.

Furthermore, in the first and second conventional compatible disk devices, the problem has arisen that the thickness of the device can not be reduced as the inventive idea of refuging both the second turntable 7 and the clamp 10 is not disclosed.

SUMMARY OF THE INVENTION

The present invention is proposed to solve the above problems and has the object of providing a compatible disk device which is downsized with respect to dimensions of height and depth.

A compatible disk device according to the present invention can play either of a first disk stored in a cartridge and a second disk not stored in a cartridge, the compatible disk device comprising: a base; a first turntable disposed on the base for transmitting a rotational force to the first disk; a second turntable for transmitting the rotational force to the second disk; a retaining arm for retaining the second turntable with a play; a clamp for clamping the second disk to the second turntable; a clamp arm for retaining the clamp; a support shaft disposed on the base in a position separated from either the first disk supported by the first turntable or the second disk supported by the second turntable; and a sub-base pivotally attached to the support shaft, the sub-base supporting the retaining arm and the clamp arm to be rotatable in a plane parallel to a disk surface of the first disk or the second disk in the layered state and to be elevated in an axial direction of the support shaft.

In such a way, when a first disk is played, the second turntable and/or the clamp arm can be refuged downwardly and in the depths of the device. Thus, it is possible to downsize the depth and the height of the compatible disk device.

According to the present invention, the compatible disk device may further comprise an arm control member for controlling the pivoting of the clamp arm and/or the retaining arm in abutment with a part of the retaining arm and/or the clamp arm.

In such a way, it is possible to limit pivoting of the retaining arm and the clamp arm when a refuge operation is performed, thereby to prevent damage to the second turntable and the clamp.

According to the present invention, the compatible disk device may further comprise a mode switching member adapted to reciprocate along a surface of a base for switching a playing mode for the first disk and a playing mode for the second disk, the mode switching member including an engagement means for rotating the sub-base with respect to the base in response to a displacement of the mode switching member and a cam means for elevating the sub-base with respect to the base in response to the displacement of the mode switching member.

In such a way, it is possible to control an elevation operation and a rotation operation in a planar direction of the second turntable and the clamp by an operation of the mode switching member as a single driving means.

According to the present invention, the compatible disk device may further comprise a retracting arm rotatably attached to the support shaft provided on the base, for retracting the first disk to a predetermined position in the device, the mode switching member being adapted to rotate the retracting arm to a refuge position in the playing mode for the second disk.

In such a way, since the retracting arm is arranged co-axially with the rotation support shaft of the sub-base, it is possible to obtain a compatible disk device in which the refuge mechanism of the clamp and/or the second turntable and the retracting mechanism of the first disk are formed compactly.

According to the present invention, the compatible disk device may further comprise a mode switching member adapted to reciprocate along the surface of the base for switching a first disk playing mode and a second disk playing mode, and an arm control member rotatably attached to the support shaft for controlling the pivoting of the retaining arm and the clamp arm in abutment with a portion of the retaining arm and the clamp arm, the mode switching member having a lever which rotates in cooperation with the subbase and an engaging pin which engages with the arm control member, the arm control member having a first cam section which converts the displacement of the engaging pin into rotation of the arm control member, the lever having a second cam section which converts the displacement of the engaging pin into rotation of the lever, the sub-base being adapted to rotate together with the arm control member through the lever in a first interval in response to the displacement of the mode switching member, the first cam section and the second cam section being adapted to vary a relative angle between the arm control member and the sub-base in a second interval in response to the displacement of the mode switching member.

In this way, it is possible to obtain a compatible disk device which can control the pivoting operation of the second turntable and the clamp in the vertical direction at either a playing position or a refuge position by the operation of a single driving means, namely the mode switching member.

BRIEF DESCRIPTION OF THE DRAWINGS

FIG. 14(A) to FIG. 14(C) are front views showing the structure of the cam member which moves in response to the mode switching member.

FIG. 15(A) to FIG. 15(D) are front views showing the structure of the arm control member which moves in response to the mode switching member.

DETAILED DESCRIPTION OF THE PREFERRED EMBODIMENT

In order to describe the invention in greater detail, the preferred embodiments of the invention will be described below with reference to the accompanying figures.

[Embodiment 1]

Figure 1A:
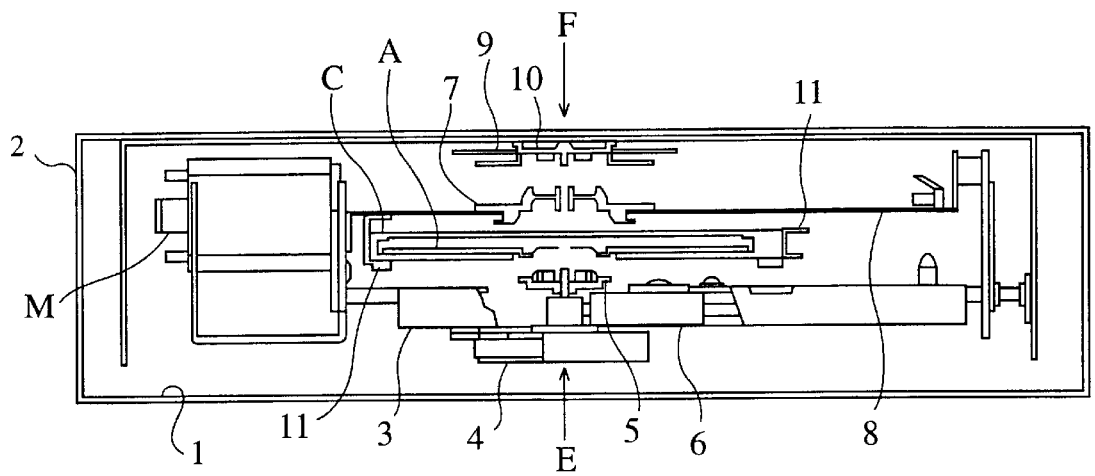
FIG. 1(A) is a front view showing the internal section of a MD-CD compatible disk device according to a first conventional example in a state where a first disk is inserted into the device.
Figure 1B:
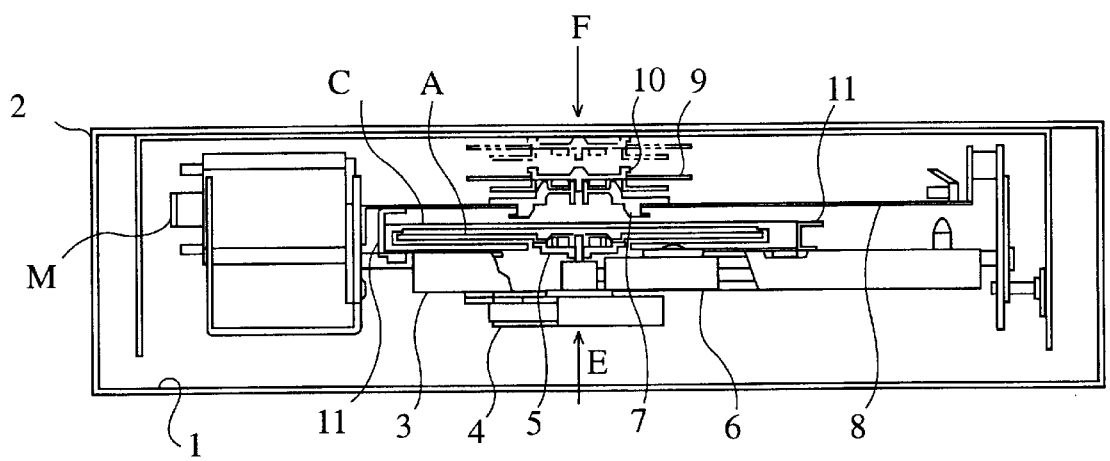
FIG. 1(B) is a front view showing the internal section in a state where the first disk is loaded to a play position.
Figure 1C:
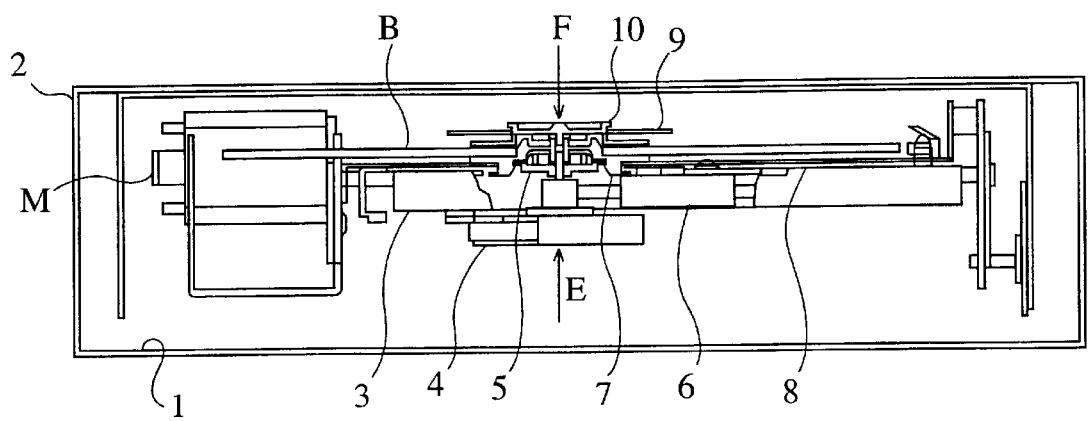
FIG. 1(C) is a front view showing the internal section in a state where a second disk is loaded to a play position.
Figure 2:
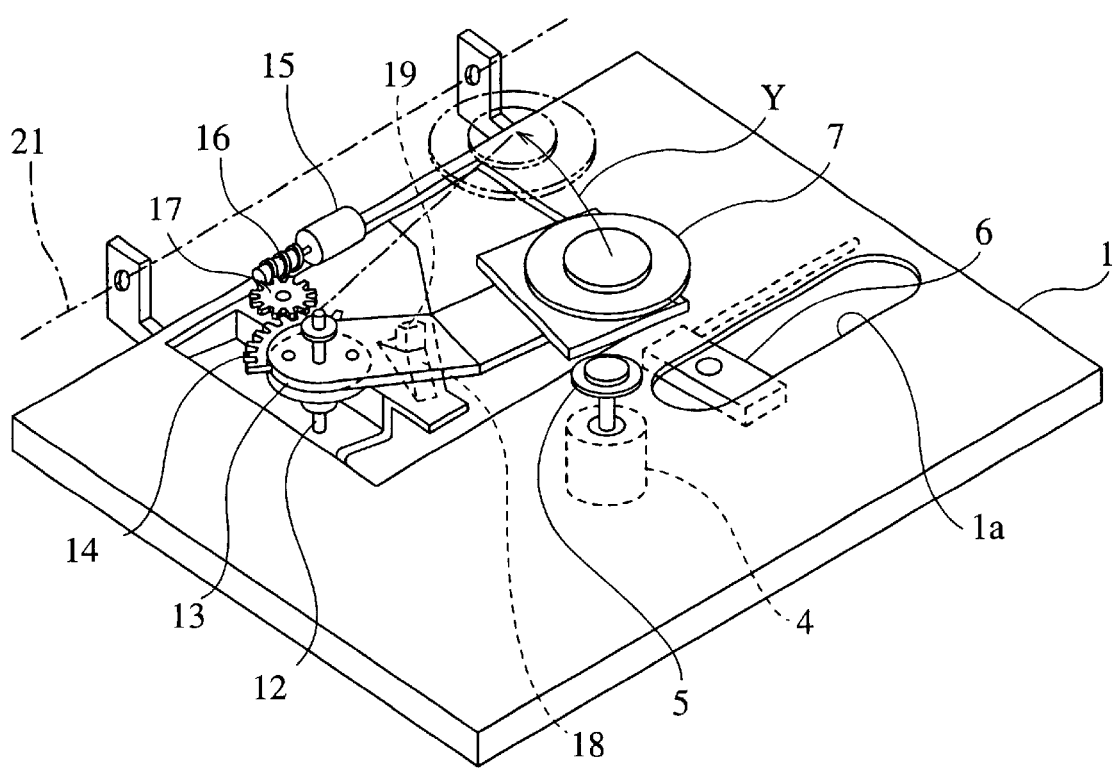
FIG. 2 is a perspective view showing the main components disposed on a base of a MD-CD compatible disk device according to a second conventional example.
Figure 3:
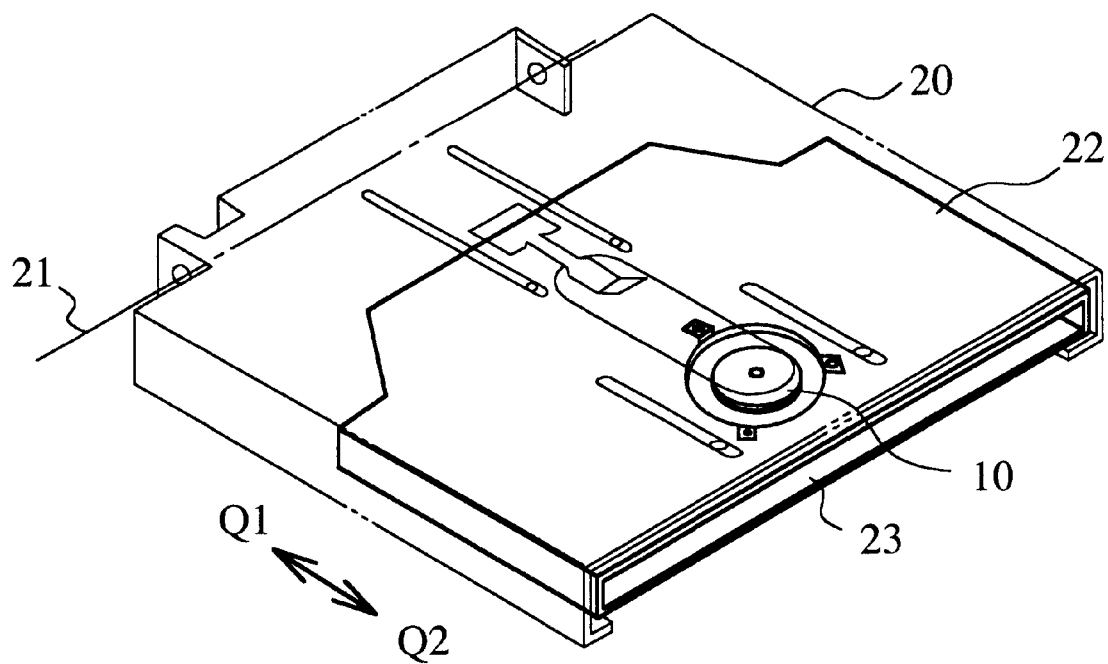
FIG. 3 is a perspective view showing the structure of a disk holder in the device as shown in FIG. 2.
Figure 4:
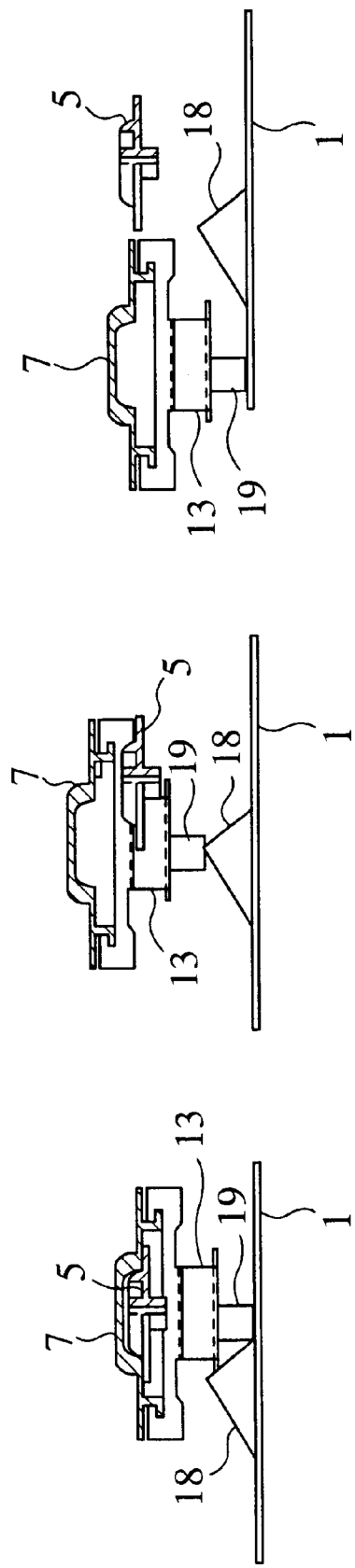
FIG. 4(A) to FIG. 4(C) are front views to describe the refuge operation of a turntable in the device as shown in FIG. 2.
Figure 5:
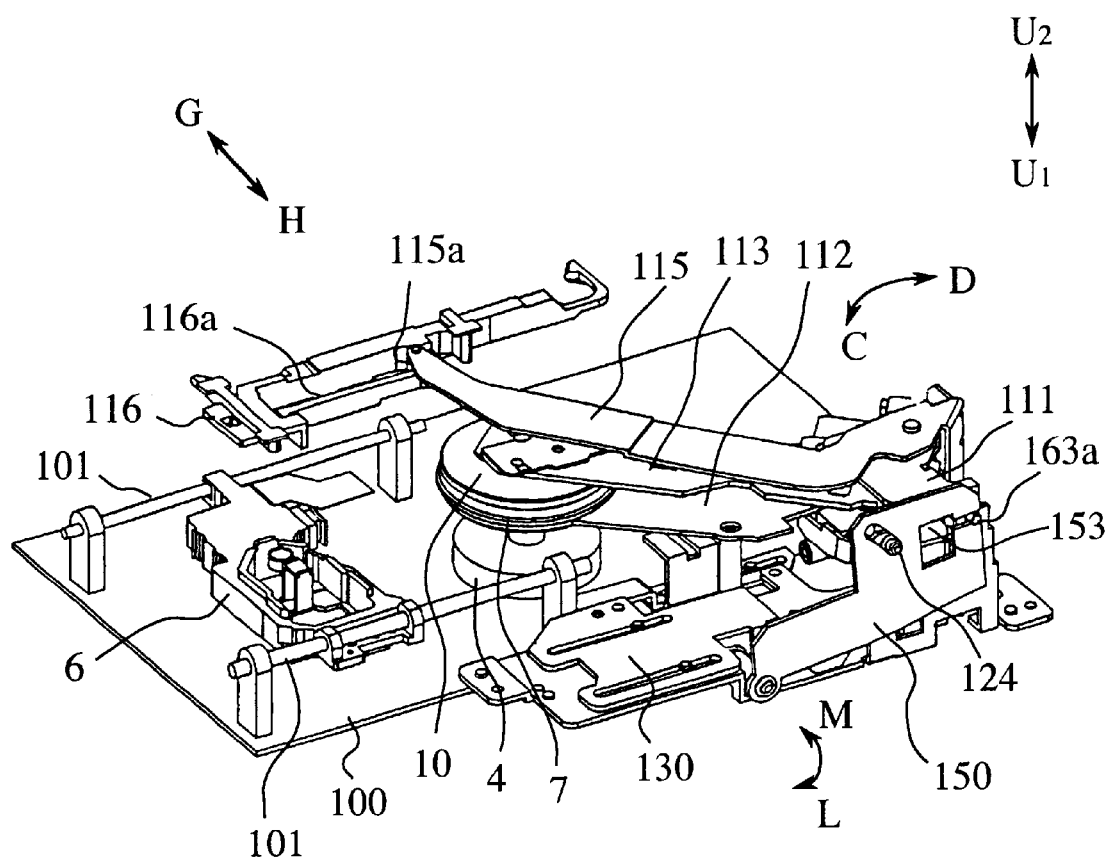
FIG. 5 is a perspective view showing the structure of a compatible disk device according to a first embodiment of the present invention.
Figure 6:
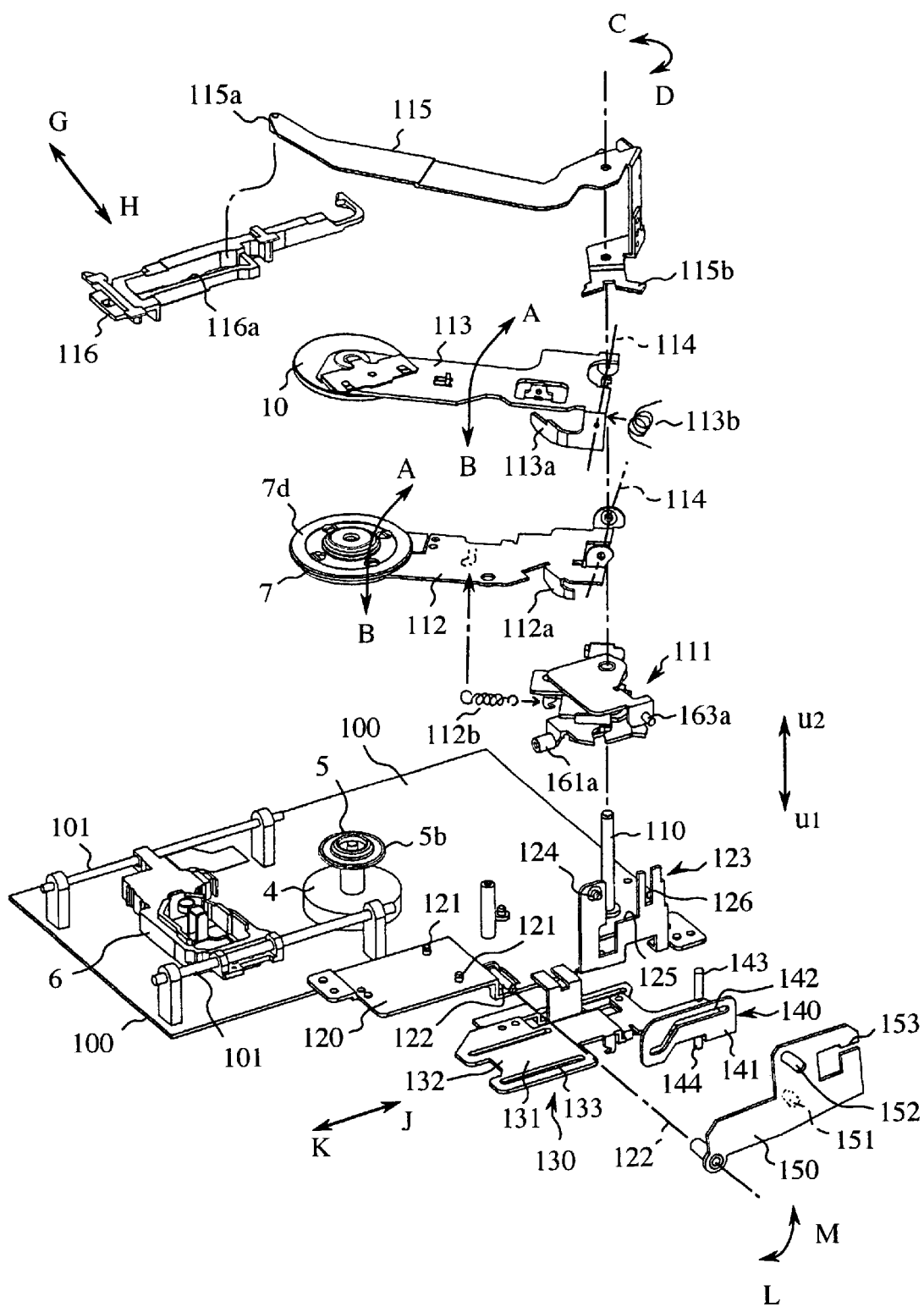
FIG. 6 is an exploded perspective view of FIG. 5.
Figure 7:
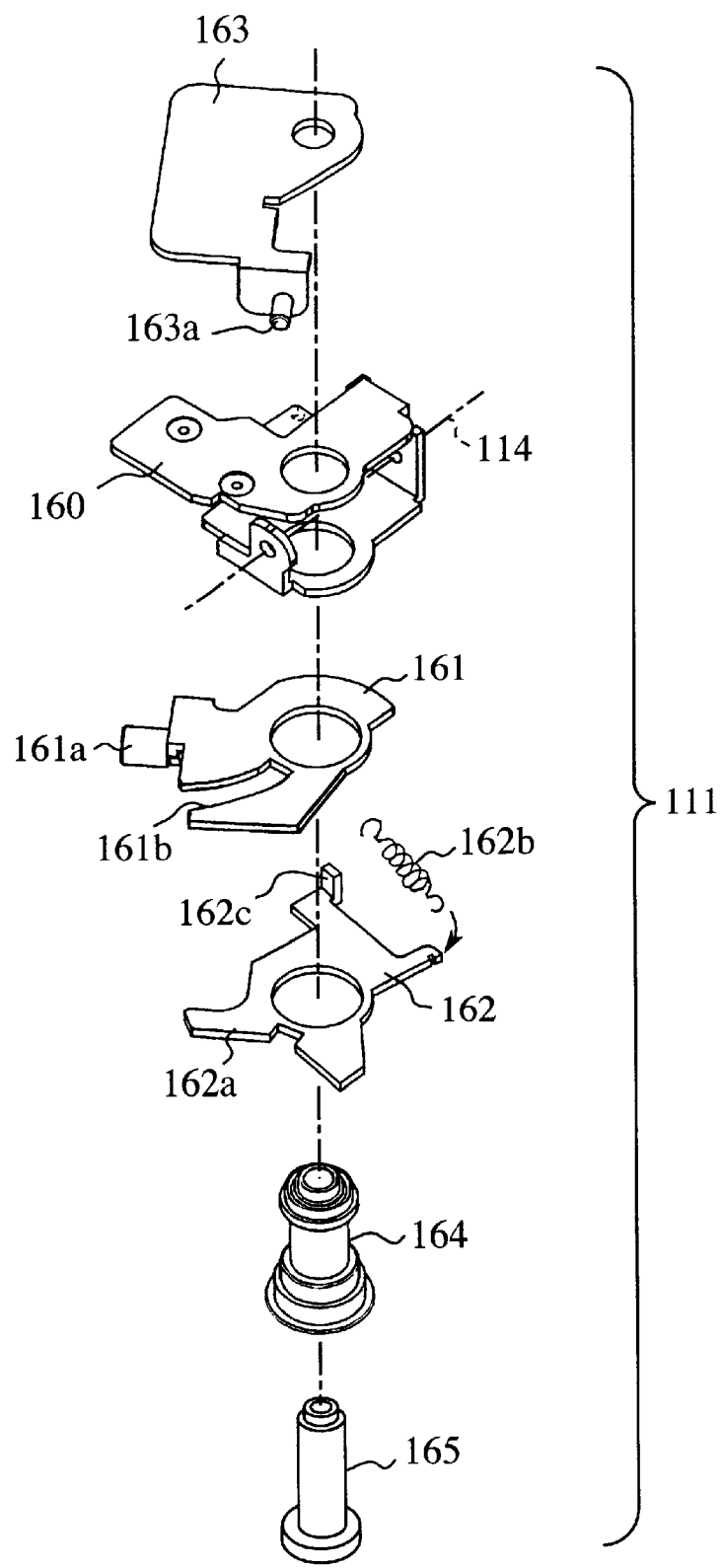
FIG. 7 is an exploded perspective view of an assembled sub-base as shown in FIG. 6.
Figure 8:
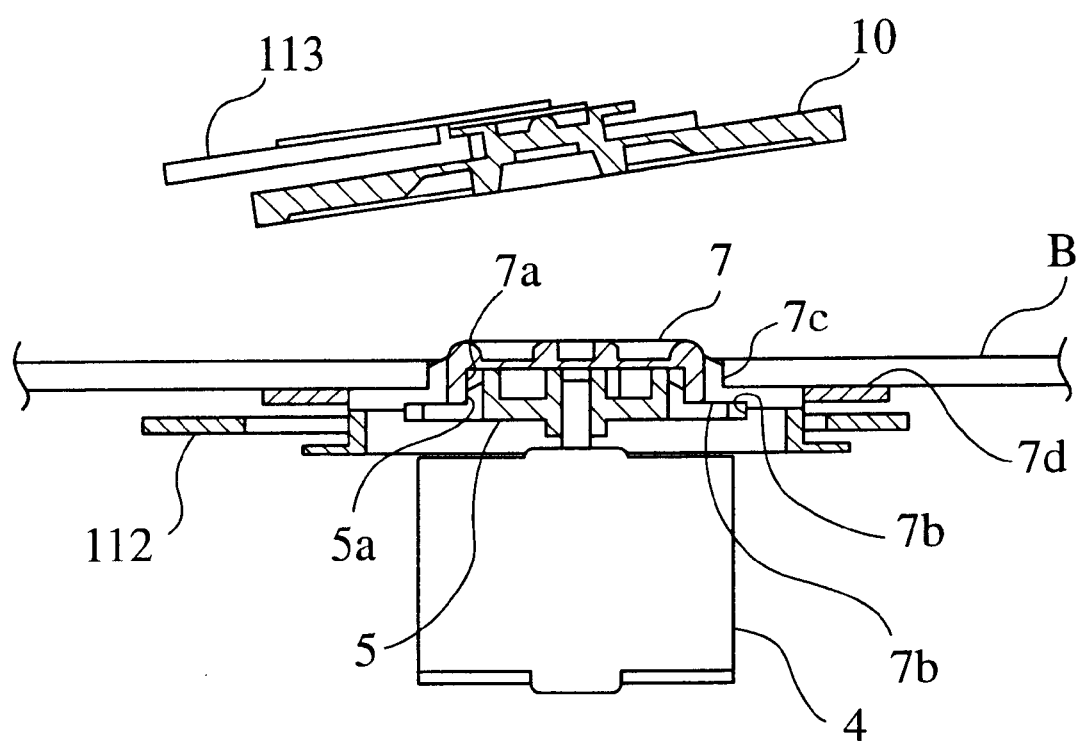
FIG. 8 is an enlarged cross sectional view showing the structure of the turntable and the clamp.

FIG. 5 to FIG. 16 show the structure of a compatible disk device according to a first embodiment of the present invention. FIG. 5 is a perspective view showing the structure of the compatible disk device. FIG. 6 is an exploded perspective view of FIG. 5. FIG. 7 is an exploded perspective view of an assembled sub-base as shown in FIG. 6. FIG. 8 is an enlarged sectional view showing the structure of a turntable and a clamp. Components of the first embodiment which are the same as those described with respect to the above first and second conventional examples are designated by the same reference numerals and further description will be omitted.

In the figures, reference numeral 100 denotes a flat base on which components of the compatible disk device are mounted. A spindle motor 4 is arranged in the center portion of the base 100 and a first turntable 5 is fixed to the spindle motor 4. A pair of guide rails 101 are disposed on the base 100 to extend parallel to a radial direction for example of the first disk A, which is loaded on the first turntable 5. An optical pickup 6 is disposed sidably on the guide rails 101. On the base 100, a support shaft 110 is arranged at a position situated on an opposite side to a mounting position of the guide rail 101 with respect to the spindle motor 4. A sub-base assembly 111 is retained with a play on the support shaft 110 to rotate and elevate. The sub-base assembly 111 retains a retaining arm 112 and a clamp arm 113 with a play in a cantilever arrangement as shown in FIG. 5 and FIG. 6. The retaining arm 112 supports a second turntable 7 which is arranged on the first turntable 5. The clamp arm 113 supports a clamp 10 which clamps a second disk in cooperation with the second turntable 7. A cam 112a and a cam 113a are formed on each base section of the clamp arm 113 and the retaining arm 112. Each base section of the retaining arm 112 and the clamp arm 113 are supported by a support shaft 114. The retaining arm 112 and the clamp arm 113 can rotate in the direction of the arrow A or B due to the support shaft 114. In FIG. 6, reference numeral 112b denotes a spring which extends between the sub-base assembly 111 and the retaining arm 112 and which urges the retaining arm 112 in the direction of the arrow B. 113b is a spring for urging the clamp arm 113 in the direction of the arrow B and generating a clamp force.

A retracting arm 115 is rotatably attached on the support shaft 110. A pin 115a is arranged on a tip portion of the retracting arm 115 to engage with the cartridge holder 116, a cam 115b is formed on a base portion of the retracting arm 115. The cartridge holder 116 retains the inserted tip portion of the cartridge of the first disk and reciprocates in the direction of the arrow G or H in FIG. 6. The cartridge holder 116 is provided with a groove 116a which extends in a direction orthogonal to the direction of the arrow G or H and which engages with the pin 115a of the retracting arm 115.

In FIG. 6, reference numeral 120 denotes a raised section which is formed on the back side of the base 100. A pair of bosses 121 are formed on the raised section 120 which are separated in a direction orthogonal to the direction of the arrow K or J. A support shaft 122 is provided on the base 100 in proximity to the raised section 120, the support shaft 122 is parallel with the upper face of the base. An upright section 123 is formed near the support shaft 110 on the base 100 by a bending process, the upright section 123 extends in the direction of the arrow K or J. A boss 124, a notched section 125 and a notched section 126 are respectively formed in the upright section 123.

In FIG. 6, reference numeral 130 denotes a mode switching member for varying the disposition of the components in accordance with a type of the disk loaded in the compatible disk device. The mode switching member 130 is basically constituted by a sliding section 131 and a cam section 140 integrated with the sliding section 131. The sliding section 131 has a flat plate 132 which slides on the raised section 120 of the base 100 and a pair of long holes 133 which are formed parallel to each other in the flat plate 132 and can be loosely engaged with the boss 121. The cam section 140 is basically constituted by a cam plate 141 which is formed in an orthogonal direction to the flat plate 132 of the sliding section 131, a cam groove 142 which is formed in the cam plate 141, a guiding pin 143 which extends in the direction of the arrow U2, and a guide pin 144 which extends in a direction of the arrow U1 and abuts with the cam 115b of the retracting arm 115. The cam groove 142 is constituted by an upper horizontal section which is formed on a side near the support shaft 110 and has a predetermined height with respect to the base 100, a lower horizontal section which is formed on a side apart from the support shaft 110 and which is lower in level than the upper horizontal section with respect to the base 100, and a sloping section which links the upper and lower horizontal sections.

In FIG. 6, reference numeral 150 denotes a lever which is supported on the support shaft 122 provided on the base 100 and pivots in the direction of the arrow L or M in the figure. A pin 151 which is engaged with the cam groove 142 of the cam section 140 of the mode switching member 130 through the notched section 125 of the upright section 123 of the base 100 is provided on one face of the lever 150. The lever 150 also has an long hole 152 which engages with the boss 124 provided in the upright section 123 of the base 100 and a squared groove 153 which engages with a pin (discussed below) of the sub-base assembly 111.

As shown in FIG. 7, the sub-base assembly 111 is basically constituted by a sub-base 160, an arm control member 161, a lever 162, a plate 163, a first cylindrical bush 164 and a second cylindrical bush 165. The sub-base 160 rotatably supports the clamp arm 113 and the retaining arm 112 by a common support shaft 114. The arm control member 161 has a pin 161a which abuts with the cam 112a of the retaining arm 112 and the cam 113a of the clamp arm 113, and a cam groove 161b which engages with the guide pin 143 provided in the cam section 140 of the mode switching member 130. The lever 162 has a first cam 162a which abuts with the guide pin 143 provided in the cam section 140 of the mode switching member 130, and a projection 162c which is urged by a spring 162b to abut with a section of the sub-base 160. The plate 163 has a pin 163a which engages with the squared groove 153 of the lever 150 through the notched section 126 provided in the upright section 123 of the base 100. The first cylindrical bush 164 passes through the arm control member 161 and the lever 162 from below and is fixed to the sub-base 160. The second cylindrical bush 165 is inserted through the first cylindrical bush 164 and is fixed to the plate 163. The second cylindrical bush 165 is supported on the support shaft 110.

As shown above, in this type of sub-base assembly 111, the plate 163, the sub-base 160, the arm control member 161 and the lever 162 respectively rotate independently about the common axis of the first cylindrical bush 164 and the second cylindrical bush 165. Further, these components can be integrally elevated in the direction of the arrow U1, U2. As a result, the clamp arm 113 and the retaining arm 112 which are pivotally supported by the sub-base 160 can also be rotated and elevated. Thus, when playing a first disk A, it is possible to refuge the second turntable 7 supported by the retaining arm 112 to a position free from interference with the first turntable 4. Further, it is possible to lower the clamp 10, which is supported on the clamp arm 113, in the refuge position.

Now the structure of the first turntable 5 and the second turntable 7 will be described with reference to FIG. 8. A cylindrical section 5a and a supporting face 5b are formed on the first turntable 5 as a centering mechanism for a first disk A. The first turntable 5 is fixed to the spindle motor 4 to rotate the first disk A placed on the supporting face 5b. Further, the first turntable 5 has a function of positioning a central hole of the first disk A stored in a cartridge C. On the other hand, the second turntable 7 is provided with a cylindrical recessed section 7a which engages with the cylindrical section 5a, an abutting face 7b for abutting with the supporting face 5b, a cylindrical section 7c for centering the second disk B, and a supporting face 7d. The second turntable 7 is supported with a play to the retaining arm 112 and rotates the second disk B placed on the supporting face 7d. The second turntable 7 has a function of positioning a central hole of the second disk B which is not stored in a cartridge C. When the second disk B loaded on the second turntable 7 is played, the second disk B is clamped on the second turntable 7 by the clamp 10 supported on the clamp arm 113.

Next, the operation of loading and playing the second disk B will be described with reference to FIG. 9(A) to FIG. 9(B), FIG. 10(A) to FIG. 10(B), and the like.

Figure 9A:
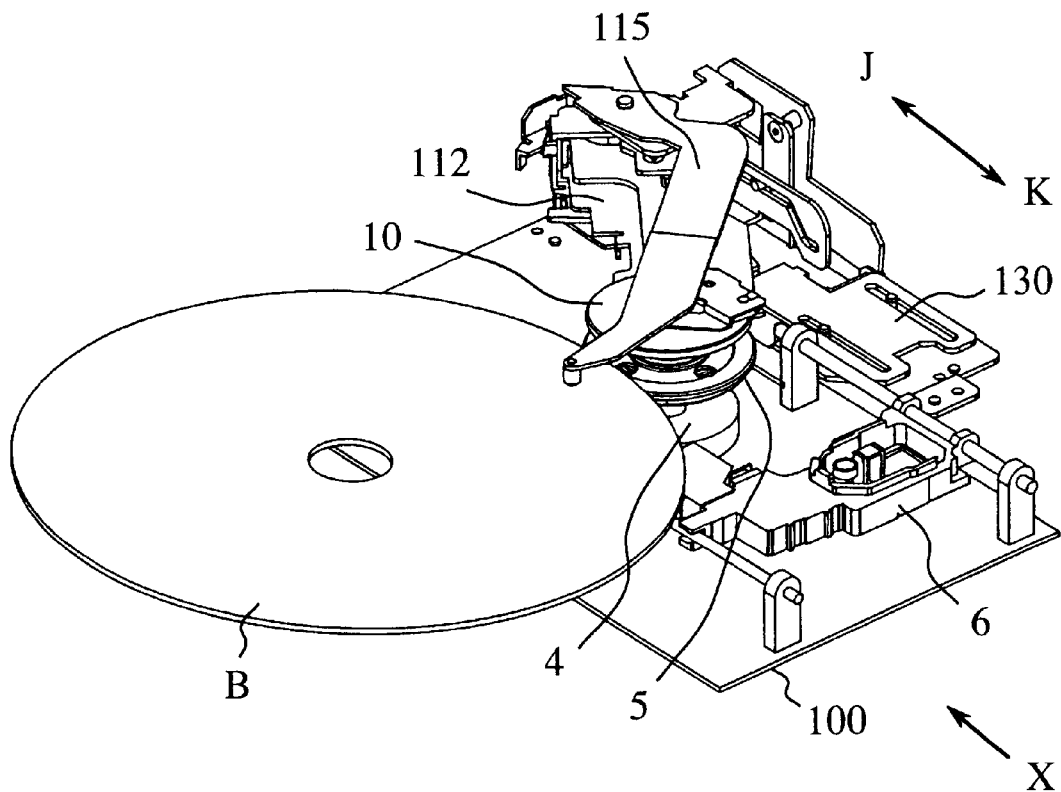
FIG. 9(A) is a perspective view showing the state before a second disk B is loaded.
Figure 9B:
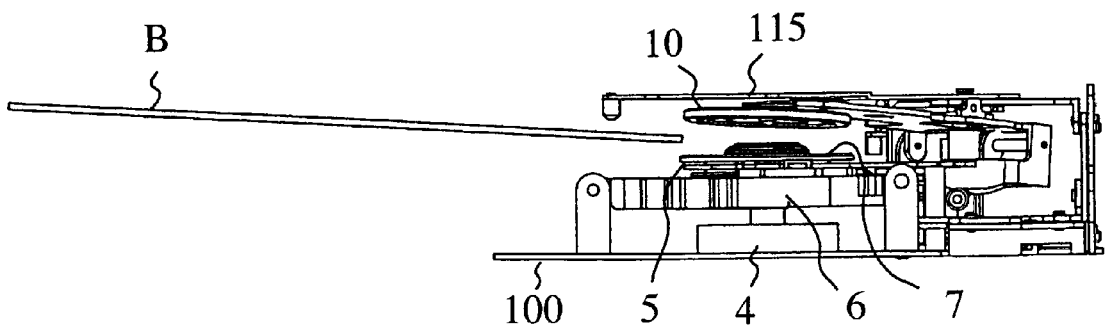
FIG. 9(B) is a perspective view of FIG. 9(A) from the direction of the arrow X.
Figure 10A:
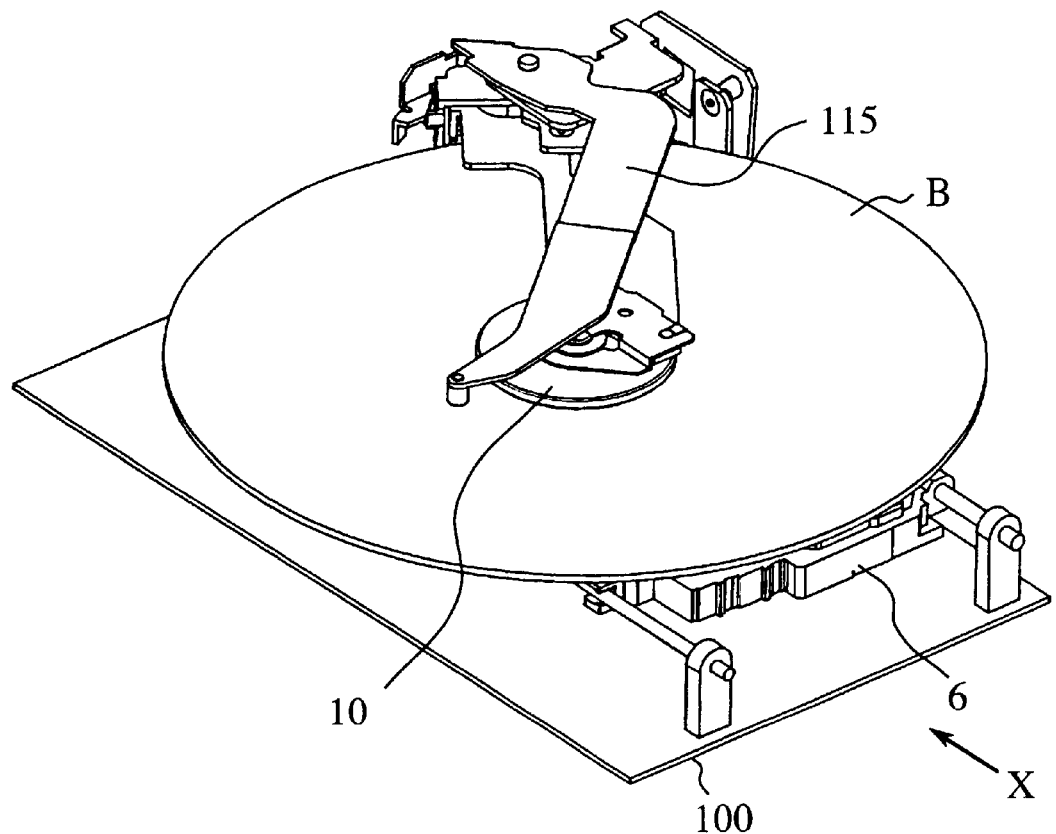
FIG. 10(A) is a perspective view showing the loaded state of the second disk B in connection with FIG. 9(A) and FIG. 9(B).
Figure 10B:
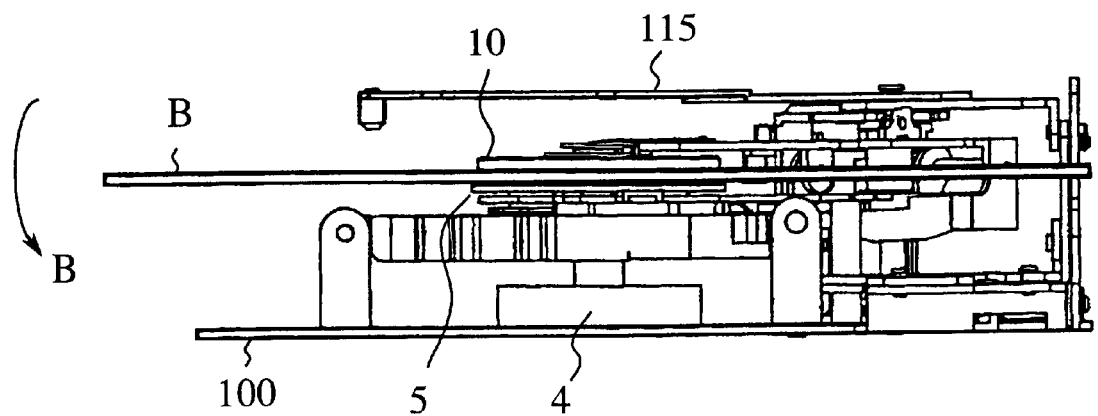
FIG. 10(B) is a perspective view of FIG. 10(A) from the direction of the arrow X.
Figure 16:
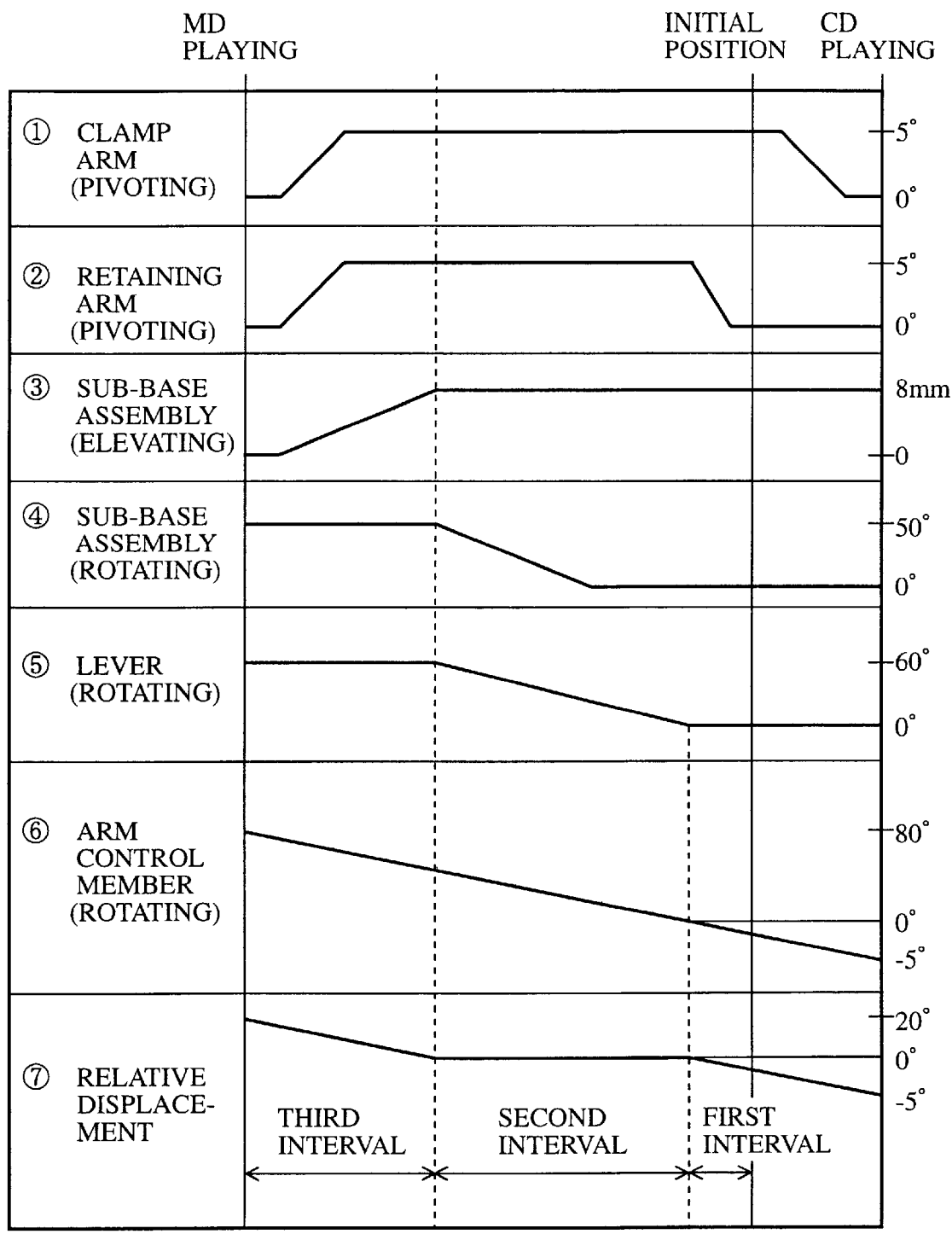
FIG. 16 is a timing chart showing the operation of the main components in the compatible disk device according to the first embodiment of the present invention.

FIG. 9(A) is a perspective view showing the state before a second disk B is loaded. FIG. 9(B) is a perspective view of FIG. 9(A) from the direction of the arrow X. FIG. 10(A) is a perspective view showing the loaded state of the second disk B in connection with FIG. 9(A) and FIG. 9(B). FIG. 10(B) is a perspective view of FIG. 10(A) from the direction of the arrow X. FIG. 14(A) to FIG. 14(C) are front views showing the structure of the cam member 140 which moves in response to the mode switching member 130. FIG. 15(A) to FIG. 15(D.) are front views showing the structure of the arm control member 161 which moves in response to the mode switching member 130. FIG. 16 is a timing chart showing the operation of the main components of the compatible disk device according to a first embodiment of the present invention.

Firstly, as shown in FIG. 9(A) and FIG. 9(B), the second turntable 7 is placed on the first turntable 5 and the retaining arm 112 is urged by a spring 112b to abut with a fixed positioning member (not shown). Thus, the second turntable 7 and the retaining arm 112 are in a state in which they are not in contact. In this state, when a second disk B is introduced to the gap between the clamp 10 and the second turntable 7 by a loading mechanism (not shown), a clutch mechanism (not shown) is operated by a trigger mechanism (not shown) for detecting the insertion of the second disk B to a predetermined position. As a result, the mode switching member 130 displaces in a direction of the arrow K. Next, the detailed operation will be described with reference to FIG. 14(A) to FIG. 14(C) which are enlarged drawings of the first cam 162a of the lever 162 and the second cam groove 161b of the arm control member 161, and FIG. 15(A) to FIG. 15(C) which are enlarged drawings of the cam 133a of the clamp arm 113 and the cam 112a of the retaining arm 112. FIG. 14(A) shows the relationship of the guide pin 143 with the first cam 162a and the second cam groove 161b. The guide pin 143 abuts with the parallel section P of the first cam 162a, which is parallel with the displacement direction of the guiding pin 143. Thus, the lever 162 does not rotate even if the guide pin 143 is displaced. On the other hand, the guide pin 143 abuts with the sloping section S of the second cam groove 161b, which extends in a direction not parallel to the displacement direction of the guide pin 143. Thus, the arm control member 161 rotates in a direction of the arrow C in response to the displacement in a direction J of the mode switching member 130 provided with the guide pin 143. At this time, the pin 161a reaches the sloping section S1 from the parallel section P of the cam 113a as shown in FIG. 15(A) to FIG. 15(B). Thus, the clamp arm 113 is urged by the spring 113b and pivots in the direction of the arrow B, and the clamp 10 presses the second disk B onto the second turntable 7 as shown in FIG. 10(A) to FIG. 10(B). Thereafter, the spindle motor 4 is rotated and the rotational driving force is transmitted to the second disk B to initiate a playing operation.

Next, the operation of loading and playing a first disk A will be described with reference to FIG. 11(A) to FIG. 11(b), FIG. 12(A) to FIG. 12(B), and FIG. 13(A) to FIG. 13(B).

Figure 11A:
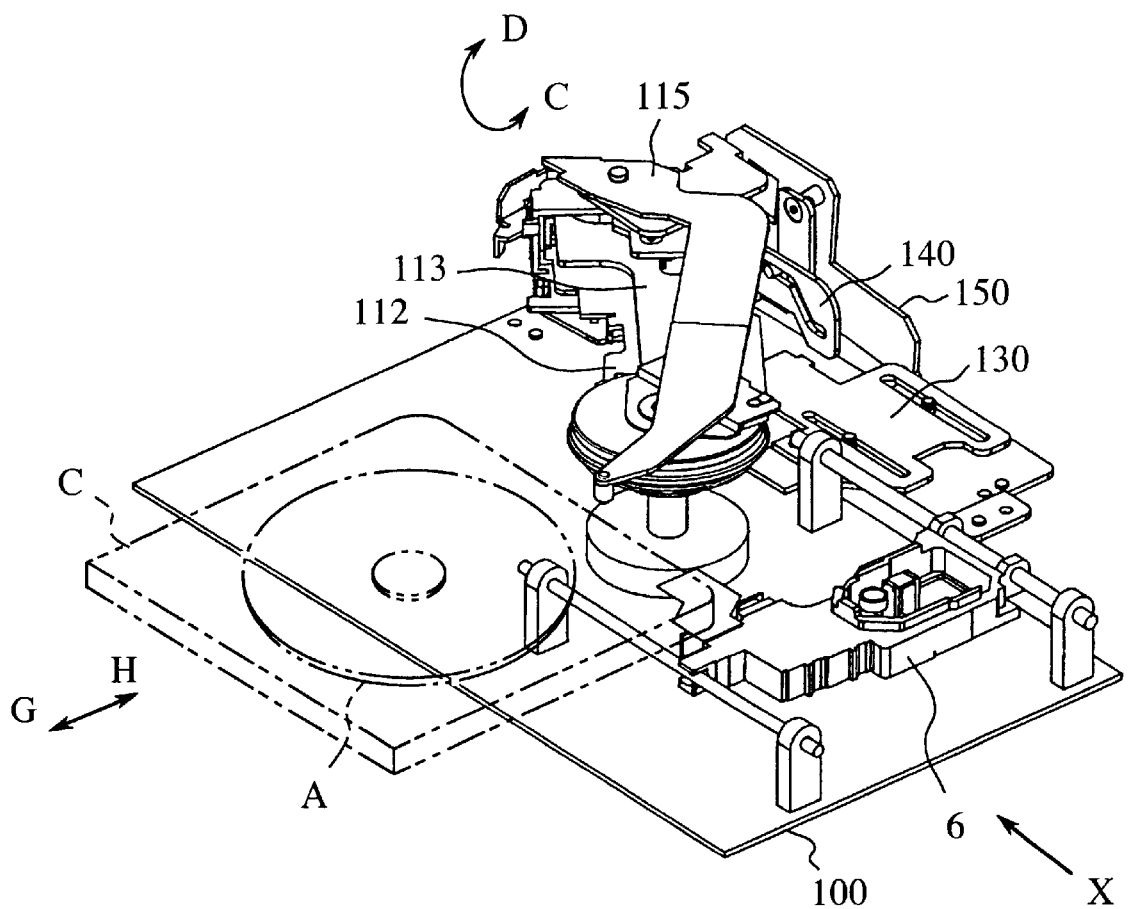
FIG. 11(A) is a perspective view showing the state in which a first disk A is inserted into the device.
Figure 11B:
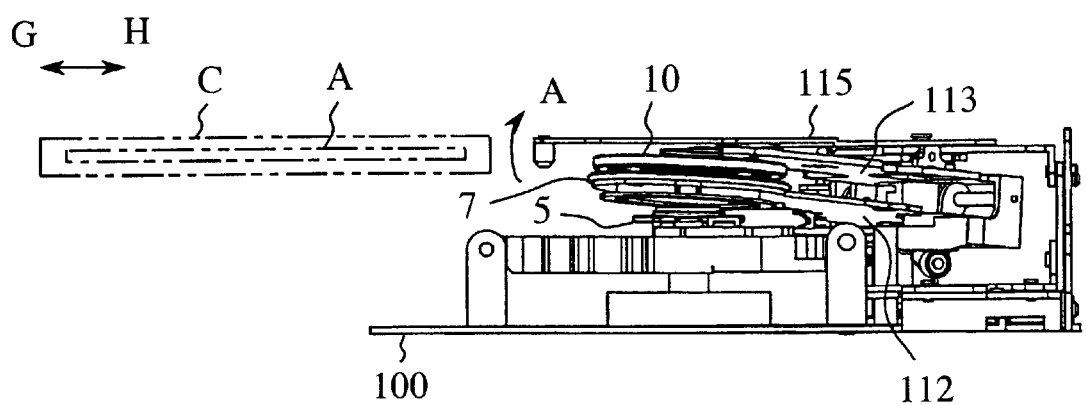
FIG. 11(B) is a perspective view of FIG. 11(A) from the direction of the arrow X.
Figure 12A:
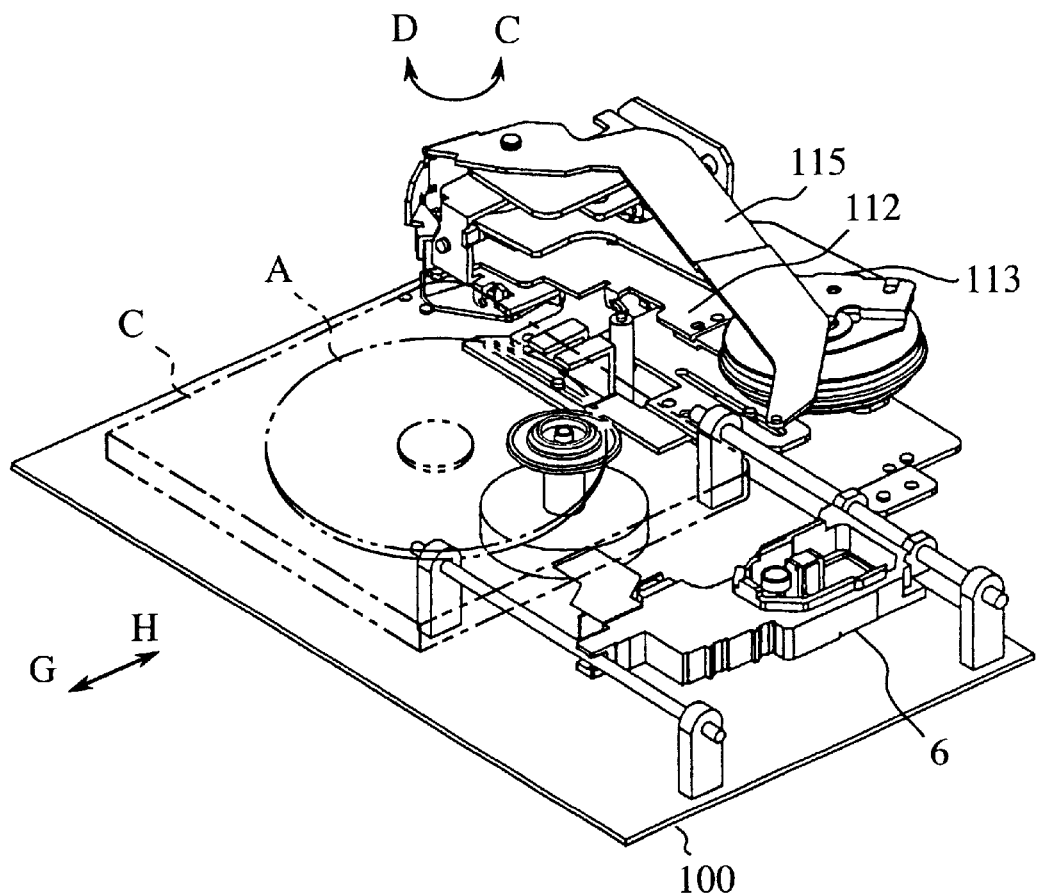
FIG. 12(A) is a perspective view showing the refuge position of the second turntable and the clamp before the first disk A is loaded.
Figure 12B:
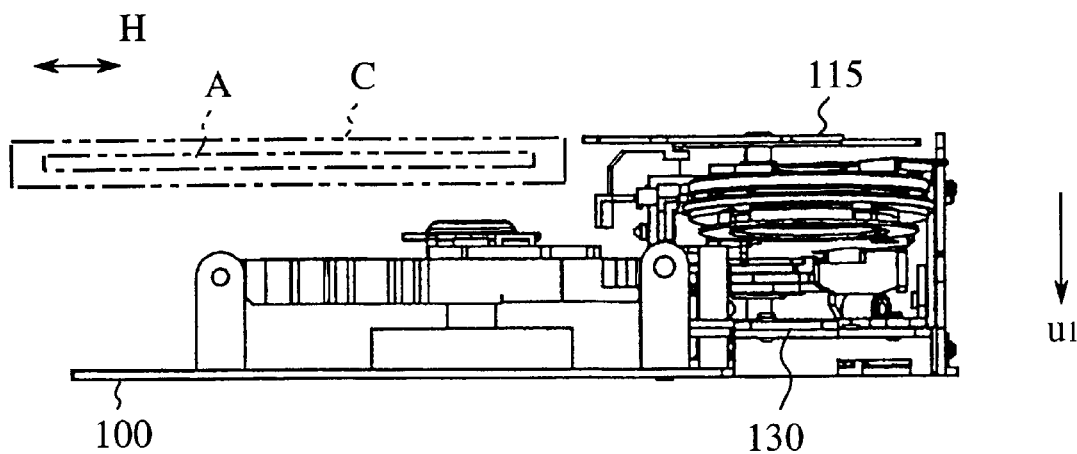
FIG. 12(B) is a perspective view of FIG. 12(A) from the direction of the arrow X.
Figure 13A:
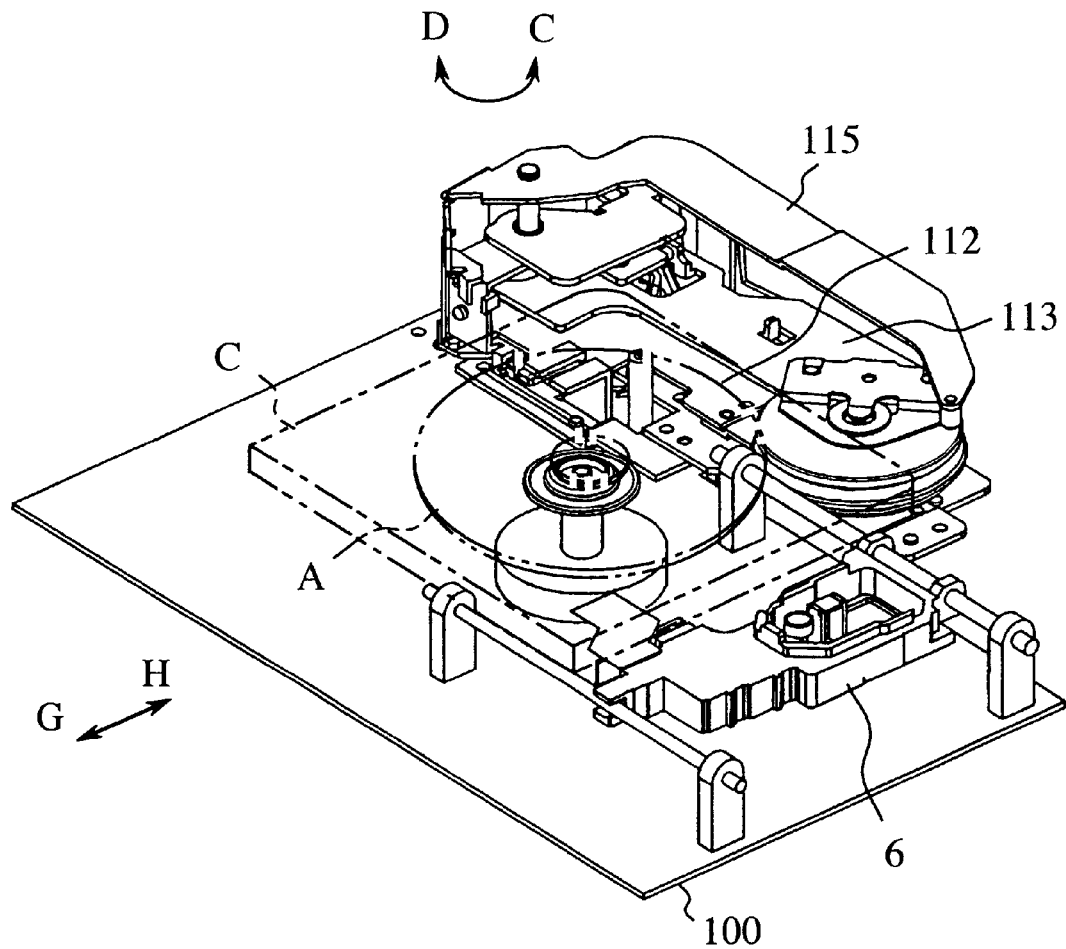
FIG. 13(A) is a perspective view showing the loaded position of the first disk A.
Figure 13B:
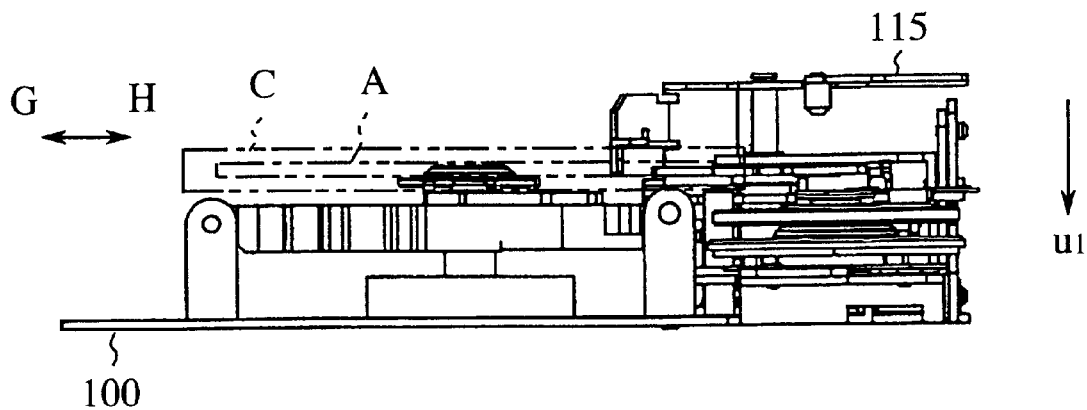
FIG. 13(B) is a perspective view of FIG. 13(A) from the direction of the arrow X.

FIG. 11(A) is a perspective view showing the state in which a first disk A is inserted into the device. FIG. 11(B) is a perspective view of FIG. 11(A) from the direction of the arrow X. FIG. 12(A) is a perspective view showing the refuge position of the second turntable 7 and the clamp 10 before the first disk A is loaded. FIG. 12(B) is a perspective view of FIG. 12(A) from the direction of the arrow X. FIG. 13(A) is a perspective view showing the loaded position of the first disk A. FIG. 13(B) is a perspective view of FIG. 13(A) from the direction of the arrow X.

As shown in FIG. 11(A) to FIG. 11(B), when a cartridge C of the first disk A is inserted in the direction of the arrow H by a loading mechanism (not shown), a clutch mechanism (not shown) is operated by a trigger mechanism (not shown) which detects the insertion of the first disk A to a predetermined position. As a result, the mode switching member 130 provided with a guide pin 143 displaces in a direction of the arrow J. As shown in FIG. 14(B), the lever 162 does not rotate in the first interval of this displacement and the arm control member 161 rotates in the direction of the arrow C. In response to this rotation operation, the pin 161a raises the cam 112a in the direction of the arrow A as shown in FIG. 11(A) to FIG. 11(B), thereby to pivot the retaining arm 112. Thus, as shown in FIG. 11(A) to FIG. 11(B), the second turntable 7 separates from the first turntable 5 and is interposed with the clamp 10.

When the mode switching member 130 displaces and reaches the second interval shown in FIG. 16, the clamp arm 113 and the retaining arm 112 which are pivotally supported to the sub-base assembly 111 rotate together up to the predetermined refuge position in the direction of the arrow C by the operation of the guide pin 143 with the first cam 162a and the second cam groove 161b as shown in FIG. 12(A) to FIG. 12(B). The refuge position is a position at which contact with the first disk A is not made. For example, the refuge position is situated on an opposite side to the disk insertion mouth (not shown) with respect to the spindle motor 4.

When the mode switching member 130 is displaced up to the third interval as shown in FIG. 16, the second cam groove 161b is rotated again in the direction C in response to the displacement of the guide pin 143 and the pin 161a reaches the sloping section S2 of the cam 112a and the sloping section S3 of the cam 113a as shown in FIG. 15(D). The retaining arm 112 and the clamp arm 113 pivot in the direction B, the clamp 10 and the second turntable 7 become approximately parallel with the disk surface.

Further, the pin 151 of the lever 150 is guided into the cam groove 142 provided in the cam section 140 of the mode switching member 130, the lever 150 pivots in the direction L. As a result, as shown in FIG. 13(A) to FIG. (B), the sub-base assembly 111 which has a pin 163a engaging with the squared groove 153 is lowered in the direction of the arrow U1. Then, the clamp 10 and the second turntable 7 are lowered and displaced in a direction approximately parallel with the disk surface up to the refuge position being free from interference with the cartridge C, while the clamp 10 and the second turntable 7 being in a layered state.

In interval 2 and interval 3 as shown in FIG. 16, the retracting arm 115 is rotated in the direction C by the engagement of the guide pin 144 with the cam 115b. As a result, the clamp 10 is driven, the cartridge C is displaced in the direction H and retracted to a predetermined position situated above the first turntable 5. Thereafter, the cartridge C is lowered by the loading mechanism (not shown) and a first disk A which is stored in the cartridge C is loaded onto the first turntable 5 to commence a playing operation. The ejection of the cartridge C is effected by a reversed operation to the above loading operation.

In the first embodiment above, the sub-base 160 is adapted to pivotally support the retaining arm 112 and the clamp arm 113 so as to interpose them. However, in a structure in which a clamp 10 does not have a function of clamping the second disk B, the sub-base 160 may be adapted to support only the retaining arm 112. Further, in a structure in which the second turntable 7 need not refuge, the sub-base 160 may be adapted to support only the clamp arm 113 so as to allow the refuge operation of the clamp arm 113.

As shown above, a compatible disk device according to the present invention is adapted to refuge a clamp arm and a second turntable, which are supported to be elevated and rotated by a sub-base, downwardly and in the depths of the device when the first disk is played. Thus, it is possible to obtain a compatible disk device with reduced dimensions with respect to height and depth.

Since the compatible disk device according to the present invention can control the pivoting of the clamp arm and the retaining arm by the arm control member during the refuge operation, it is possible to prevent damage to the clamp or the second turntable.

The compatible disk device according to the present invention can control the raising or lowering operation and the rotation operation in a planar direction of the clamp and the second turntable by the operation of a single drive means due to a mode switching member.

Further, according to the present invention, since a retracting arm for retracting a first disk to a fixed position in the device is arranged coaxially with the rotation support shaft of the sub-base, it is possible to obtain a compatible disk device enabling a compact arrangement of the refuge mechanism of the second turntable and/or the clamp and the retracting mechanism of the first disk.

Furthermore, according to the present invention, it is possible to obtain a compatible disk device which can control the pivoting operation of the second turntable and the clamp in the vertical direction at either a playing position or a refuge position by the operation of a single drive means, namely, the mode switching member.

What is claimed is:

1. A compatible disk device capable of playing either of a first disk stored in a cartridge and a second disk not stored in a cartridge, said compatible disk device comprising:
   a base;
   a first turntable disposed on said base for transmitting a rotational force to said first disk;
   a second turntable for transmitting a rotational force to said second disk;

a retaining arm for retaining said second turntable with a play;

a support shaft disposed on said base in a position separated from either said first disk supported by said first turntable or said second disk supported by said second turntable; and a sub-base attached movably to said support shaft, said sub-base supporting said retaining arm to be rotatable in a plane parallel to a disk surface of said first disk or said second disk and to be pivotally elevated in an axial direction of said support shaft.

2. The compatible disk device according to claim 1, further comprising an arm control member for controlling a pivoting operation of said retaining arm in abutment with a part of the retaining arm.

3. The compatible disk device according to claim 1, further comprising a mode switching member adapted to reciprocate along a surface of said base for switching a first disk playing mode and a second disk playing mode, said mode switching member including an engagement means for rotating said sub-base with respect to said base in accordance with a displacement of said mode switching member and a cam means for elevating said sub-base with respect to said base in accordance with the displacement of said mode switching member.

4. The compatible disk device according to claim 3, further comprising a retracting arm rotatably attached to said support shaft for retracting the first disk to a predetermined position in the device, said mode switching member being adapted to rotate said retracting arm to a refuge position in the second disk playing mode.

5. The compatible disk device according to claim 1, further comprising:

a mode switching member adapted to reciprocate along a surface of said base for switching a first disk playing mode and a second disk playing mode; and an arm control member rotatably attached to said support shaft for controlling a pivoting operation of said retaining arm in abutment with a part of said retaining arm, said mode switching member having a lever which rotates in cooperation with said sub-base and an engaging pin which engages with said arm control member, said arm control member having a first cam section which converts a displacement of said engaging pin into rotation of said arm control member, said lever having a second cam section which converts the displacement of said engaging pin into rotation of said lever, and in response to a displacement of said mode switching member, said sub-base being adapted to rotate together with said arm control member through said lever in a first interval, said first cam section and said second cam section being adapted to vary a relative angle between said arm control member and said sub-base in a second interval.

6. A compatible disk device capable of playing either of a first disk stored in a cartridge and a second disk not stored in a cartridge, said compatible disk device comprising:

a base;

a first turntable disposed on said base for transmitting a rotational force to said first disk;

a second turntable for transmitting the rotational force to said second disk;

a clamp for clamping said second disk to said second turntable;

a clamp arm for retaining said damp;

a support shaft disposed on said base in a position separated from either said first disk supported by said first turntable or said second disk supported by said second turntable; and a sub-base attached movably to said support shaft, said sub-base supporting said clamp arm to be rotatable in a plane parallel to a disk surface of said first disk or said second disk and to be pivotally elevated in an axial direction of said support shaft.

7. The compatible disk device according to claim 6, further comprising an arm control member for controlling the pivoting of said clamp arm in abutment with a part of said clamp arm.

8. The compatible disk device according to claim 6, further comprising a mode switching member adapted to reciprocate along a surface of said base for switching a first disk playing mode and a second disk playing mode, said mode switching member including an engagement means for rotating said sub-base with respect to said base in accordance with a displacement of said mode switching member, and a cam means for elevating said sub-base with respect to said base in accordance with the displacement of said mode switching member.

9. The compatible disk device according to claim 8, further comprising a retracting arm rotatably attached to said support shaft of said base for retracting the first disk to a predetermined position in the device, said mode switching member being adapted to rotate said retracting arm to a refuge position in the second disk playing mode.

10. The compatible disk device according to claim 6, further comprising:

a mode switching member adapted to reciprocate along a surface of said base for switching a first disk playing mode and a second disk playing mode; and an arm control member rotatably attached to the support shaft of the base for controlling a pivoting operation of said clamp arm in abutment with a part of said clamp arm, said mode switching member having a lever which rotates in cooperation with said sub-base and an engaging pin which engages with said arm control member and, said arm control member having a first cam section which converts a displacement of said engaging pin into rotation of said arm control member, said lever having a second cam section which converts the displacement of said engaging pin into rotation of said lever, and in response to a displacement of said mode switching member, said sub-base being adapted to rotate together with said arm control member through said lever in a first interval, said first cam section and said second cam section being adapted to vary a relative angle between said arm control member and said sub-base in a second interval.

11. A compatible disk device capable of playing either of a first disk stored in a cartridge and a second disk not stored in a cartridge, said compatible disk device comprising:

a base;

a first turntable disposed on said base for transmitting a rotational force to said first disk;

a second turntable for transmitting the rotational force to said second disk;

a retaining arm for retaining said second turntable with a play;

a clamp for clamping said second disk to said second turntable;

a clamp arm for retaining said clamp;

a support shaft disposed on said base in a position separated from either said first disk supported by said first turntable or said second disk supported by said second turntable; and a sub-base attached movably to said support shaft, said sub-base supporting said retaining arm and said clamp arm to be rotatable in a plane parallel to a disk surface of said first disk or said second disk in the layered state and to be pivotally elevated in an axial direction of said support shaft.

12. The compatible disk device according to claim 11, further comprising an arm control member for controlling a pivoting operation of said retaining arm and said clamp arm in abutment with a part of said clamp arm and said retaining arm.

13. The compatible disk device according to claim 11, further comprising a mode switching member adapted to reciprocate along a surface of said base for switching a first disk playing mode and a second disk playing mode, said mode switching member including an engagement means for rotating said sub-base with respect to said base in response to a displacement of said mode switching member, and a cam means for elevating said sub-base with respect to said base in response to the displacement of said mode switching member.

14. The compatible disk device according to claim 13, further comprising a retracting arm rotatably attached to said support shaft on said base for retracting the first disk to a predetermined position in the device, said mode switching member being adapted to rotate said retracting arm to a refuge position in the second disk playing mode.

15. The compatible disk device according to claim 11, further comprising:

a mode switching member adapted to reciprocate along a surface of said base for switching a first disk playing mode and a second disk playing mode; and an arm control member rotatably attached to the support shaft of the base for controlling a pivoting operation of said retaining arm and said clamp arm in abutment with a part of said retaining arm and said clamp arm, said mode switching member having a lever which rotates in cooperation with said sub-base and an engaging pin which engages with said arm control member, said arm control member having a first cam section which converts a displacement of said engaging pin into rotation of said arm control member, said lever having a second cam section which converts the displacement of said engaging pin into rotation of said lever, and in response to a displacement of said mode switching member, said sub-base being adapted to rotate together with said arm control member through said lever in a first interval, said first cam section and said second cam section being adapted to vary a relative angle between said arm control member and said sub-base in a second interval.

* * * * *